US012566865B2

(12) United States Patent
    Razinkov et al.

(10) Patent No.: US 12,566,865 B2
(45) Date of Patent: Mar. 3, 2026

(54) MEMBERSHIP INFERENCE ATTACKS USING MULTIPLE SPECIALIZED MACHINE LEARNING MODELS

(71) Applicant: International Business Machines Corporation, Armonk, NY (US)

(72) Inventors: Natalia Razinkov, Haifa (IL); Shlomit Shachor Ifergan, Yokneam Eilit (IL); Abigail Goldsteen, Haifa (IL); Guy Amit, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 18/439,782

(22) Filed: Feb. 13, 2024

(65) Prior Publication Data

US 2025/0258923 A1 Aug. 14, 2025

(51) Int. Cl.
*G06F 21/57* (2013.01)
*G06F 21/55* (2013.01)

(52) U.S. Cl.
CPC .......... *G06F 21/577* (2013.01); *G06F 21/556* (2013.01)

(58) Field of Classification Search
CPC ............................. G06F 21/577; G06F 21/556
See application file for complete search history.

(56) References Cited

U.S. PATENT DOCUMENTS

| | | | |
|---|---|---|---|
| 12,505,229 B2 * | 12/2025 | Santana De Oliveira | .................. G06F 21/60 |
| 2006/0063156 A1 * | 3/2006 | Willman | ................. A61P 35/02 435/325 |
| 2017/0061322 A1 * | 3/2017 | Chari | ................. H04L 63/1425 |
| 2023/0274003 A1 | 8/2023 | Liu | |

FOREIGN PATENT DOCUMENTS

| | | | | |
|---|---|---|---|---|
| CN | 115169562 A | 10/2022 | | |
| CN | 116614271 A | 8/2023 | | |
| WO | WO-2019067542 A1 * | 4/2019 | ............. | G06N 3/044 |

OTHER PUBLICATIONS

Cortes et al., "Advances in Neural Information Processing System 28", 29th Annual Conference on Neural Information Processing Systems 2015, Montreal Canada, Dec. 7-12, 2015, 29 pages.
U.S. Appl. No. 18/125,830, filed Sep. 26, 2024, Abigail Goldsteen.

(Continued)

*Primary Examiner* — Amir Mehrmanesh
*Assistant Examiner* — Forrest L Carey
(74) *Attorney, Agent, or Firm* — Stephen R. Yoder

(57) ABSTRACT

A method including: receiving a training dataset and a testing dataset each comprising samples that were used to train and to test, respectively, a certain machine learning model; dividing the training dataset into non-overlapping training subsets, and the testing dataset into non-overlapping testing subsets; assigning the training subsets and the testing subsets into pairs, such that each of the pairs is a distinct combination of one of the training subsets with one of the testing subsets; training different membership inference attack (MIA) models on the pairs; and evaluating sensitive information leakage from the certain machine learning model based on aggregated inferences by the trained MIA models.

20 Claims, 4 Drawing Sheets

(56) References Cited

OTHER PUBLICATIONS

Jiayuan Ye et al., "Enhanced Membership Inference Attacks against Machine Learning Models"; Online at: https://arxiv.org/pdf/2111. 09679.pdf, Sep. 13, 2022.

Jiayuan Ye et al., "Privacy Auditing of Machine Learning Using Membership Inference Attacks"; Online at: https://openreview.net/ pdf?id=EG5Pgd7-MY, Jan. 29, 2022.

Jinyuan Jia et al., "Memguard: Defending against black-box membership inference attacks via adversarial examples"; In Proceedings of the 2019 ACM SIGSAC conference on computer and communications security; pp. 259-274, Nov. 6, 2019.

Matthew Jagielski et al., "How to Combine Membership-Inference Attacks on Multiple Updated Models"; Online at: https://arxiv.org/ abs/2205.06369, May 12, 2022.

Matthias Feurer et al., "Efficient and Robust Automated Machine Learning"; Advances in Neural Information Processing Systems 28, pp. 2962-2970, May 18, 2019.

Moshe Levy et al., "The security of deep learning defences for medical imaging"; Online at: https://arxiv.org/abs/2201.08661, Jan. 21, 2022.

Reza Shokri et al., "Membership Inference Attacks Against Machine Learning Models"; Online at: https://www.cs.cornell.edu/~shmat/ shmat_oak17.pdf, Oct. 18, 2016.

Wenqi Wei et al., "Robust deep learning ensemble against deception"; IEEE Transactions on Dependable and Secure Computing, vol. 18, No. 4, 1513-1527, Sep. 14, 2020.

Xinlei He et al., "Membership-Doctor: Comprehensive Assessment of Membership Inference Against Machine Learning Models"; Online at: https://arxiv.org/abs/2208.10445, Aug. 22, 2022.

Yijue Wang et al., "Against membership inference attack: Pruning is all you need"; Online at: https://arxiv.org/pdf/2008.13578.pdf, Jul. 4, 2021.

Zhongwang Fu et al., "ELAA: An Ensemble-Learning-Based Adversarial Attack Targeting Image-Classification Model"; MDPI Journals, Entropy 2023, vol. 25, Issue 2, Jan. 22, 2023.

Zikui Cai et al., "Ensemble-based Blackbox Attacks on Dense Prediction"; Online at: https://arxiv.org/abs/2303.14304, Mar. 25, 2023.

* cited by examiner

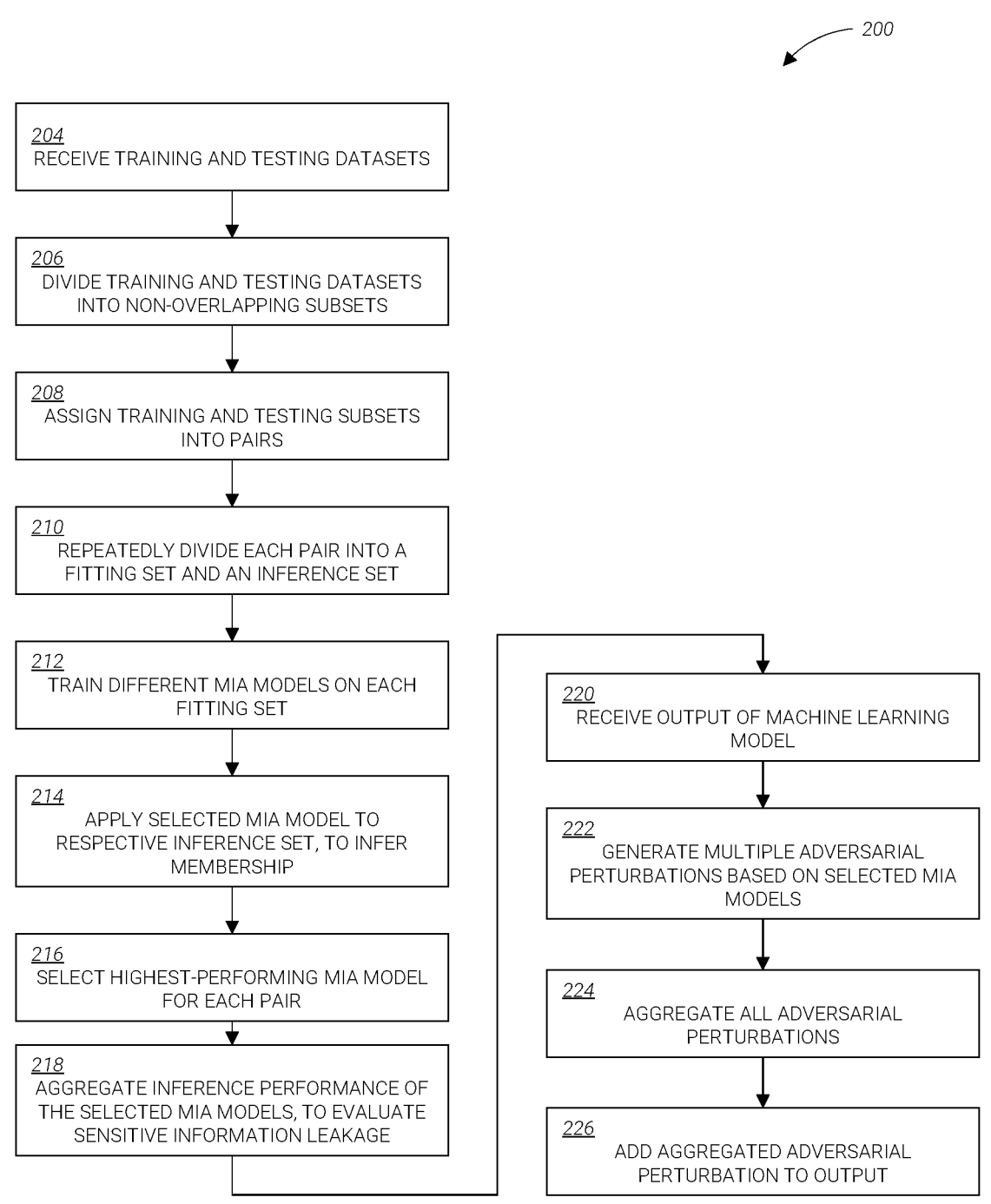

*200*

204
RECEIVE TRAINING AND TESTING DATASETS

206
DIVIDE TRAINING AND TESTING DATASETS INTO NON-OVERLAPPING SUBSETS

208
ASSIGN TRAINING AND TESTING SUBSETS INTO PAIRS

210
REPEATEDLY DIVIDE EACH PAIR INTO A FITTING SET AND AN INFERENCE SET

212
TRAIN DIFFERENT MIA MODELS ON EACH FITTING SET

214
APPLY SELECTED MIA MODEL TO RESPECTIVE INFERENCE SET, TO INFER MEMBERSHIP

216
SELECT HIGHEST-PERFORMING MIA MODEL FOR EACH PAIR

218
AGGREGATE INFERENCE PERFORMANCE OF THE SELECTED MIA MODELS, TO EVALUATE SENSITIVE INFORMATION LEAKAGE

220
RECEIVE OUTPUT OF MACHINE LEARNING MODEL

222
GENERATE MULTIPLE ADVERSARIAL PERTURBATIONS BASED ON SELECTED MIA MODELS

224
AGGREGATE ALL ADVERSARIAL PERTURBATIONS

226
ADD AGGREGATED ADVERSARIAL PERTURBATION TO OUTPUT

FIGURE 2

MEMBERSHIP INFERENCE ATTACKS USING MULTIPLE SPECIALIZED MACHINE LEARNING MODELS

BACKGROUND

The invention relates to the field of machine learning model security.

Artificial intelligence (AI) systems, sometimes called machine learning (ML) systems, have become prevalent in everyday life. AI is used in retail, security, manufacturing, health, finance, and many more sectors to improve or even replace existing processes. However, with the rise in AI adoption, different risks associated with AI have been identified, including security and privacy risks. For example, an AI model may inadvertently expose sensitive information that was included in its training data, such as personal information of people who wished the information to remain private, confidential information belonging to certain people or organizations, etc. These risks have given rise to the notion of "Trustworthy" or "Responsible" AI.

A key aspect of Responsible AI is the ability to assess (and later mitigate) these risks. Assessing the privacy risk of machine learning (ML) models is crucial to enable well-informed decision-making about whether to use a model in production, share it with third parties, or deploy it in customers' homes. The most prevalent approach to privacy risk assessment is to run one or more attacks against the model and measure how successful they are in leaking personal information.

One of the most common attacks used in model evaluation is called membership inference. Membership inference (MI) attacks aim to violate the privacy of individuals whose data was used in training an ML model by attempting to distinguish between samples that were part of a target model's training data (called "members") and samples that were not ("non-members"), based on the model's outputs in response to the attack. These outputs can be class probabilities or logits (for classification models), the model's loss, or activations from internal layers of the model (in white-box attacks). Many attacks are designed with one or more of these features, and are based on training a binary classifier to try to distinguish between members and non-members.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a computer-implemented method comprising: receiving a training dataset and a testing dataset each comprising samples that were used to train and to test, respectively, a certain machine learning model; dividing the training dataset into non-overlapping training subsets, and the testing dataset into non-overlapping testing subsets; assigning the training subsets and the testing subsets into pairs, such that each of the pairs is a distinct combination of one of the training subsets with one of the testing subsets; training different membership inference attack (MIA) models on the pairs; and evaluating sensitive information leakage from the certain machine learning model based on aggregated inferences by the trained MIA models.

Another embodiment relates to a system comprising (a) at least one hardware processor; and (b) a non-transitory computer-readable storage medium having program code embodied therewith, the program code executable by said at least one hardware processor to: receive a training dataset and a testing dataset each comprising samples that were used to train and to test, respectively, a certain machine learning model; divide the training dataset into non-overlapping training subsets, and the testing dataset into non-overlapping testing subsets; assign the training subsets and the testing subsets into pairs, such that each of the pairs is a distinct combination of one of the training subsets with one of the testing subsets; train different membership inference attack (MIA) models on the pairs; and evaluate sensitive information leakage from the certain machine learning model based on aggregated inferences by the trained MIA models.

A further embodiment relates to a computer program product comprising a non-transitory computer-readable storage medium having program code embodied therewith, the program code executable by at least one hardware processor to: receive a training dataset and a testing dataset each comprising samples that were used to train and to test, respectively, a certain machine learning model; divide the training dataset into non-overlapping training subsets, and the testing dataset into non-overlapping testing subsets; assign the training subsets and the testing subsets into pairs, such that each of the pairs is a distinct combination of one of the training subsets with one of the testing subsets; train different membership inference attack (MIA) models on the pairs; and evaluate sensitive information leakage from the certain machine learning model based on aggregated inferences by the trained MIA models.

In some embodiments, the method further comprises, or the program code is further executable for, prior to the training of the different MIA models: repeatedly dividing each of the pairs into a fitting set and an inference set, thereby producing multiple fitting and inference sets for each of the pairs, such that: each of the multiple fitting and inference sets comprises samples from both the respective training subset and the respective testing subset, and in each repetition, the samples are distributed differently among the multiple fitting and inference sets.

In some embodiments, the training of the different MIA models comprises: training the different MIA models on each of the multiple fitting sets, wherein each the MIA models differs in at least one of the following parameters: classifier type, feature, or feature scaling method; for each of the pairs, applying the selected trained MIA models to the respective inference set, to infer whether each of the samples in the respective inference set is a member of the training dataset; and for each of the pairs, selecting one of the trained MIA models that has a highest inference performance.

In some embodiments, the aggregated inferences are obtained by aggregating the inferences of all the selected trained MIA models.

In some embodiments: the classifier type is selected from the group consisting of: a random forest classifier, a k-nearest neighbors classifier, a decision tree classifier, and a neural network classifier; the feature is selected from the group consisting of: entropy, loss, label, logit, and class probability; and the feature scaling is selected from the group consisting of: standard scaling, minmax scaling, robust scaling, mean normalization, max absolute scaling, unit vector scaling, logarithmic scaling, and quantile transforms.

In some embodiments, the method further comprises, or the program code is further executable for, preventing sensitive information leakage from the certain machine learning model by: receiving an output of the certain machine learning model; generating adversarial perturbations based on the trained different MIA models, respective of the received output; aggregating the generated adversarial perturbations into a single adversarial perturbation; and applying the single adversarial perturbation to the received output, to generate a revised output that does not convey information on whether a certain sample was used to train the certain machine learning model.

In some embodiments: the certain machine learning model is a shadow model of a target machine learning model; the received training and testing datasets have contents that resemble estimated characteristics of an unknown training dataset and an unknown testing dataset, respectively, of the target machine learning model; and the method further comprises, or the program code is further executable for, evaluating sensitive information leakage from the target machine learning model based on the evaluation of sensitive information leakage from the certain machine learning model.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 2 is a flow chart of a method for evaluation and/or prevention of sensitive information leakage from a machine learning model, according to an embodiment.

DETAILED DESCRIPTION

Figure 1:
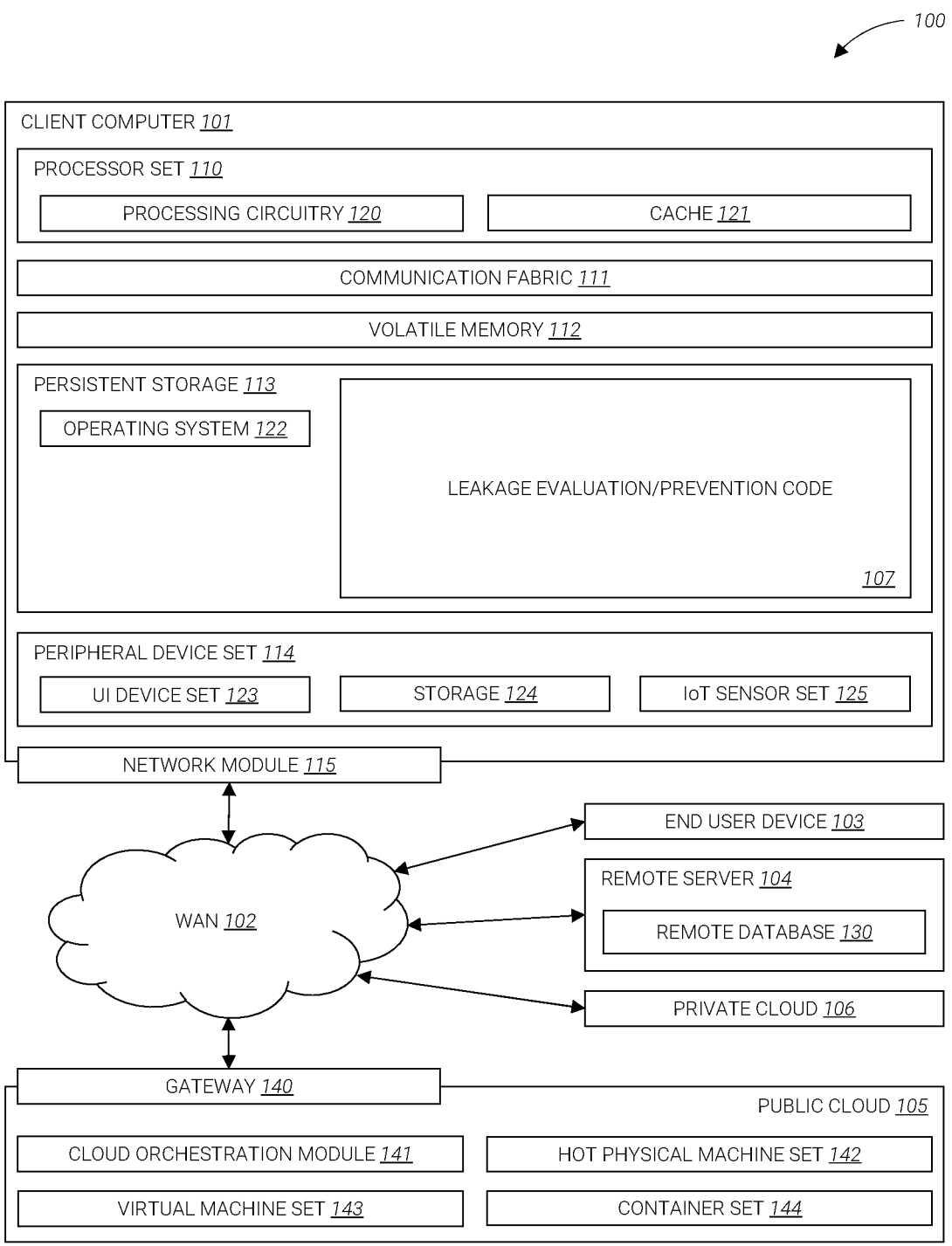
FIG. 1 is a block diagram of an exemplary computer environment for evaluation and/or prevention of sensitive information leakage from a machine learning model, according to an embodiment.

Disclosed herein is a technique, embodied in a method, a system, and a computer program product, for evaluating (and optionally also preventing) leakage of sensitive information from a certain machine learning model. Advantageously, the evaluation may include execution of multiple membership inference attacks (MIAs) against the model, using multiple small, specialized MIA models that were trained on relatively small subsets of the training and testing datasets of the evaluated model.

In general terms, the technique may include dividing the each of the training ("member") and testing ("non-member") datasets of the evaluated model into non-overlapping subsets. Then, the subsets (namely, the training subsets and the testing subsets resulting from the division) may be assigned into pairs, such that each of the pairs is a distinct combination of one of the training subsets with one of the testing subsets. Next, each of the pairs may be repeatedly divided into a fitting set and an inference set, thereby producing multiple fitting and inference sets for each of the pairs, such that each of the multiple fitting and inference sets includes samples from both the respective training subset and the respective testing subset, and in each repetition, the samples are distributed differently among the multiple fitting and inference sets.

Then, different MIA models (namely, the small, specialized MIA models referred to above) may be trained on each of the multiple fitting sets. Each of these MIA models may differ from the other MIA models in one or more parameters, such as classifier type, features, scaling, etc. Each of the trained MIA models is then applied to the respective inference set, to infer whether each of the samples in the respective inference set is a member of the training dataset or not. Next, for each of the pairs, one of the trained MIA models that had a highest inference performance may be selected.

The technique may be utilized in several ways, or "modes." One example is use of the technique when access to the training and testing datasets of the machine learning model (also referred to herein as the "target" model) is available. This is typically done by the owner of the target model, who wishes to evaluate how vulnerable their model is to MIAs that may cause leakage of sensitive information. Another example is use of the technique in a way that the MIAs are devised on the basis of a "shadow" model that mimics the characteristics of the target model. There are in fact two varieties to this example: One is when these MIAs are used for attacking the target model. Another is when the technique ends with the results obtained on the shadow model alone, without attacking the target model itself; these results serve as an educated guess, or an estimation, of how well the MIAs will be able to attack a target model which is similar to the shadow model.

The technique also optionally includes prevention of sensitive information leakage from the certain machine learning model, by applying an adversarial perturbation to its output; this generates a revised output which does not reveal membership information; namely, the revised output does not convey information that can be used to deduce whether a certain sample is a "member"-whether it was used to train the target model. Advantageously, the adversarial perturbation may be an aggregate of multiple different adversarial perturbations generated based on the selected, trained, MIA models.

The term "sensitive information," as referred to throughout this disclosure, is intended to include any type of information which is desired not to be included in the output of a machine learning model. For example, sensitive information may include personal information (also "personal data," "personally identifying information (PII)," or "sensitive personal information (SPI)") about a real person, such as information that can be used to distinguish or trace a person's identity, such as name, national identification number, social security number, driver's license number, date and place of birth, mother's maiden name, residential address, Internet Protocol (IP) address, email address, telephone number, or biometric records. Personal information could also be information that is linked or linkable to a person, such as medical, educational, financial, or employment information of that person. It should be noted that the terms "personal information," "personal data," "PII," and "SPI" are legal concepts, not technical ones, and their use and meaning (as well as other names used to describe similar concepts) may vary between jurisdictions and regulations.

Another example of "sensitive information" may be information which is not necessarily personal, but is still considered to be confidential by its owner or by a different stakeholder. For example, such confidential information may include a person's or an organization's confidential business information, whose leakage may cause harm to its owner and/or to others.

Reference is now made to FIG. 1, which shows a block diagram of an exemplary computing environment 100, containing an example of an environment for the execution of at least some of the computer code involved in performing the inventive methods, such as leakage evaluation and/or prevention code 200. In addition to block 200, computing environment 100 includes, for example, a computer 101, a wide area network (WAN) 102, an end user device (EUD) 103, a remote server 104, a public cloud 105, and/or a private cloud 106. In this example, computer 101 includes a processor set 110 (including processing circuitry 120 and a cache 121), a communication fabric 111, a volatile memory 112, a persistent storage 113 (including an operating system 122 and block 200, as identified above), a peripheral device set 114 (including a user interface (UI), a device set 123, a storage 124, and an Internet of Things (IoT) sensor set 125), and a network module 115. Remote server 104 includes a remote database 130. Public cloud 105 includes a gateway 140, a cloud orchestration module 141, a host physical machine set 142, a virtual machine set 143, and a container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as a network interface controller (NIC), a modem, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through the hardware included in network module 115.

WAN 102 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The instructions of leakage evaluation and/or prevention code 107 are now discussed with reference to the flowchart of FIG. 2, which illustrates a method 200 for evaluating, and optionally also preventing, leakage of sensitive information from a certain machine learning model, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by computer 101 of FIG. 1, or by any other applicable component of computing environment 100), unless specifically stated otherwise.

Those of skill in the art will recognize that the manner in which certain steps of method 200 are executed may be based on the mode (as discussed above) the technique is desired to be used. Further details on this are provided in the description of the relevant steps, below. In addition, some principles of membership inference using a shadow model may be found in R. Shokri et al., "Membership Inference Attacks against Machine Learning Models," in Proceedings of the IEEE Symposium on Security and Privacy, 2017.

In a step 204, a training dataset and a testing dataset may be received. Each of these datasets may include "samples," pieces of data that were used to train and to test, respectively, a certain machine learning model, which could be the target model or one or more shadow models, as briefly discussed above and as is further discussed below where relevant.

When method 200 is executed in the mode where the training and testing datasets of the target model are accessible, the datasets received at step 204 are those of the target model itself.

Conversely, when method 200 is executed in the mode where the training and testing datasets of the target model are inaccessible, the training and testing datasets are those used to train and test, respectively, the shadow model. Their contents are therefore chosen so that they resemble estimated characteristics of an unknown training dataset and an unknown testing dataset, respectively, of the target machine learning model.

In a step 206, the received training dataset may be divided into non-overlapping subsets, referred to here as "training subsets," and the testing dataset may be similarly divided into non-overlapping subsets, referred to here as "testing subsets." By "non-overlapping" it is meant that each subset includes a unique group of samples not found in any other subset.

The size of each subset may be relatively small, for example, 20-200 samples, or more specifically 40-100 samples. However, the size may exceed those values if this is deemed beneficial.

In a step 208, the training subsets and the testing subsets may be assigned into pairs, such that each pair is a distinct combination of one of the training subsets with one of the testing subsets. One possibility for this pairing is to perform an exhaustive combinatorial combination, unordered, of the training and testing subsets. Namely, the pairs will include every possible combination of each training subset with every testing subset. Another possibility is to randomly assign the pairs, such that the resulting number of pairs is according to a number predefined by a user of method 200.

In a step 210, each of the pairs is further divided, repeatedly, into a fitting set and an inference set. This division is optionally halving, namely—each of the pairs is divided into two equal halves, each half including the same number of samples. The repeated division produces multiple fitting and inference sets for each of the pairs, such that each of the multiple fitting and inference sets includes samples from both the respective training subset and the respective testing subset, and in each repetition, the samples are distributed differently among the multiple fitting and inference sets (namely, in each repetition, each fitting set and inference set will include a different combination of samples).

Optionally, the number of repetitions of step 210 is predefined by a user of method 200, and could be, for example, between 5 and 10.

Step 210 may be performed in an alternative manner, in which each of the pairs is divided into a fitting set and an inference set only once, without repeating this division further. This will yield one fitting set and one inference set per pair.

In step 212, different MIA models may be trained on each of the multiple fitting sets. Each MIA model differs from all others in at least one of the following parameters: classifier type, feature, or feature scaling method. Optionally, as to the feature and the feature scaling method, each model may differ from all others by multiple features and/or multiple feature scaling methods.

Possible classifier types include a random forest classifier, a k-nearest neighbors classifier, a decision tree classifier, a neural network classifier, or any other machine learning classifier type known in the art.

Possible features include entropy, loss, label, logit, class probability, or any other feature known in the art to be extractable or calculable from the outputs of a machine learning model.

As to scaling, this may include different methods of scaling (also "normalization") of any of the features listed above. Exemplary methods include standard scaling, min-max scaling, robust scaling, mean normalization, max absolute scaling, unit vector scaling, logarithmic scaling, quantile transforms, or any other feature scaling method known in the art.

Step 212 may be able to yield relatively small, highly-specialized MIA models, because they were trained on small, specific groups of samples, with many combinations of parameters such as classifier types, features, and/or scaling of features, and on many fitting sets.

In step 214, for each of the pairs, each of the trained MIA models may be applied to the respective inference set (the inference set belonging to the same division, in step 210, as the fitting set on which the MIA model has been trained in step 212), to infer whether each of the samples in the respective inference set is a member of the training dataset received in step 204 (essentially, classify each sample as a "member" or a "non-member").

In step 216, for each of the pairs, one of the trained MIA models that has a highest inference performance (in step 214) may be selected. This yields multiple trained MIA models that have performed the best for their respective pairs. Namely, they are the best at inferring "membership" for the specific samples included in their respective pairs. Inference performance may be deduced from one or more metrics such as accuracy, balanced accuracy, AUC-ROC (area under the receiver operating characteristic curve), TPR (True Positive Rate) achieved while maintaining a low FPR (False Positive Rate), or any other known classifier performance metric.

In a step 218, the inference performance of all the selected trained MIA models may be aggregated, using a technique such as averaging, majority voting, or the like. This aggregated inference performance represents, in essence, a quantitative evaluation (e.g., in the form of a score) of sensitive information leakage from the certain machine learning model, namely-how prone the model is to such leakage.

Step 218 optionally includes an additional action of normalization, to bring the score to an interval between 0 and 1, for instance. By way of example, if a baseline accuracy of a membership attack is known to be 0.5, then the score related to this baseline may be normalized, to yield a score between 0 and 1 that represents the degree of leakage. Other techniques for normalization of the score are also possible.

If method 200 is executed in "attacker" mode, then step 218 may further include indirectly evaluating sensitive information leakage from the target machine learning model, based on the evaluated sensitive information leakage from the shadow model.

Optionally, for instance when the training and testing datasets are particularly large, the above-mentioned steps of method 200 may be performed separately on distinct portions of these datasets, instead of on the entire datasets at once. Merely as an example, if each of the training and testing datasets includes 50,000 samples, these may be divided into 50 smaller portions of 1,000 samples each; then, the above-mentioned steps of method 200 may be performed 50 times, every time on a different portion of the larger datasets.

Figure 3:
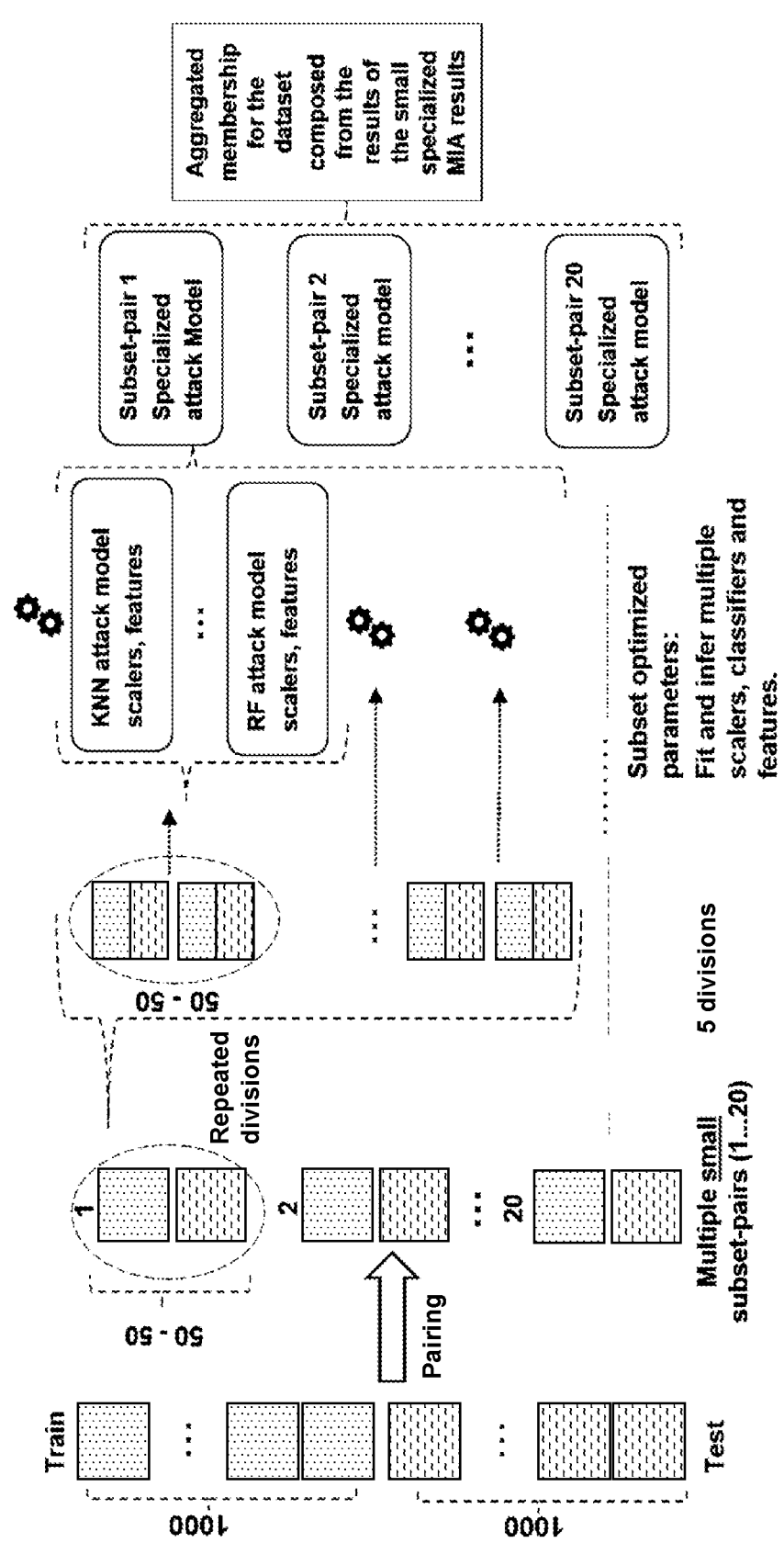
FIG. 3 is a flow diagram illustrating an example of a portion of the method of FIG. 2, according to an embodiment.

Reference is now made to FIG. 3, which is a flow diagram illustrating an example in accordance with steps 202-218 of method 200.

From left to right, there are shown 1000 exemplary training samples and 1000 exemplary testing samples. These are divided into 20 training subsets of 50 samples each and 20 testing subsets of 50 samples each, and then paired into 20 overall pairs, for example. Each pair is divided (halved) 5 times, for example, wherein each division includes a different composition of a fitting set and an inference set. Then, the fitting sets are used to train multiple different MIA models, such as the shown k-nearest neighbors (KNN) model and random forest (RF) model. Each of these models may differ by type, scalers, and/or features. For each pair, each of the trained MIA models is applied to the respective inference set, and the best-performing (at inference) trained MIA model per pair is selected, yielding the shown subset-pair 1-20 specialized attack models. Lastly, membership inferences by these selected, best-performing models are aggregated from the results of the selected attack models.

Reference is now made back to FIG. 2. Optionally, method 200 further includes a series of steps 220, 222, 224, and 226 for preventing sensitive information leakage from the certain machine learning model. This may be performed by:

In step 220, an output of the certain machine learning model, for example in response to a query (also "prompt") from a user, may be received. The output may essentially be intercepted so that it is not received by the user, as the output may still, at this stage, include sensitive information.

In step 222, adversarial perturbations may be generated based on the selected trained MIA models, respective of the received output. This may include an adversarial perturbation per MIA model. Each adversarial perturbation may be a noise vector added to a confidence score vector predicted by the certain machine learning model in association with the output. Such noise vector, and the way it is added to the confidence score vector to mislead a membership inference attacker, are further discussed in J. Jia et al., "MemGuard: Defending against Black-Box Membership Inference Attacks via Adversarial Examples," arXiv: 1909.10594v3 [cs.CR], 18 Dec. 2019.

In step 224, the generated adversarial perturbations may be aggregated into a single adversarial perturbation. The aggregation may involve averaging the generated adversarial perturbations, or calculating a different statistical measure of these perturbations, such as their mode or median.

In step 226, the single (aggregated) adversarial perturbation may be added to the output of the certain machine learning model. This generates a revised (also "protected") output that is devoid of membership information; namely, the revised output does not convey information that can be used to deduce whether a certain sample is a "member"—whether it was used to train the certain machine learning model. Advantageously, in contrast to J. Jia et al., this single adversarial perturbation is based on a multiplicity of small, specialized MIA models.

Figure 4:
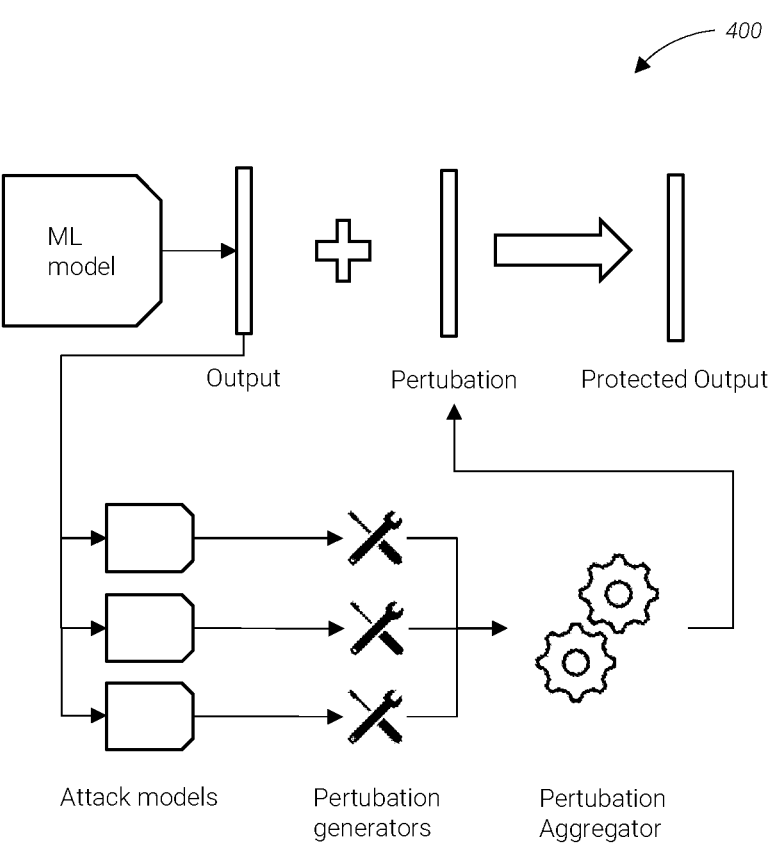
FIG. 4 is a flow diagram illustrating an example of another portion of the method of FIG. 2, according to an embodiment.

Reference is made to FIG. 4, which shows a flow diagram 400 illustrating steps 220-226 of method 200. The certain machine learning (ML) model is operated, to infer an output. The output, instead of being transmitted or displayed to a user, is transmitted to multiple MIA models, such as the selected trained MIA models of step 216 of method 200. An adversarial perturbation is then generated based on each MIA model, and these perturbations are aggregated into one perturbation. That single perturbation is then added to the output of the certain machine learning model, to generate revised ("protected") output which is devoid of membership information.

Experimental Results

Experiments with several LLM (Large Language Model) architectures and datasets were conducted: Two classification models from Hugging Face, Inc. of New York, NY: textattack/bert-base-uncased-SST-2 fine-tuned on glue-SST2 (BB SST2), and textattack/roberta-base-CoLA fine-tuned on glue-CoLA (RB CoLA); one generative model from Google LLC, of Mountain View, CA: google/flan-ul2 trained with glue-CoLA (F-UL2 CoLA) and with glue-SST2 (F-UL2 SST2); and a ROBERTa-based model (Yinhan Lui et al., 2019) fined-tuned with the Rotten Tomatoes dataset (RB RT).

To evaluate the effectiveness of the present technique on models with a privacy defense, the ROBERTa-based model was also evaluated after applying differentially private fine-tuning using DP LoRA (D. Yu et al., "Differentially Private Fine-tuning of Language Models," ICLR 2022) with $\epsilon=2$ (RB-DP RT).

The present technique was compared both to training a single attack model on the entire dataset and class-based attacks, where a separate attack model is trained per class label.

In the experiments, the subset size was set to 50 samples, the number of repeated divisions to 5, the number of instances to 50, and the number of the member and non-member samples for each instance to 1000 each (872 for SST-2). For each model (LLM architecture) and its corresponding data, six experiments were conducted: using a single attack model for the entire dataset (S-CL01) and a single model for class 0 (S-CL0) and for class 1 (S-CL1); and using many small specialized attack models for the entire dataset (M-CL01), for class 0 (M-CL0), and for class 1 (M-CL1). In these experiments, the following features were used to train the attack models: true labels, predicted labels, class-scaled probabilities, class-scaled logits, losses, and modified entropy.

For google/flan-UL2, a generative model, commonly available prompts were used for COLA and SST2, requesting the model to classify the linguistic correctness of a sentence or its sentiment, respectively. The model was instructed to generate a score structure instead of just text, and low temperature mode was used to ensure determinism. The score structure was used to calculate the features mentioned above. In addition, the perplexity for each of the choices ("positive" and "negative" for SST2) was calculated, and it was used as an additional feature.

The average accuracy and area under the receiver operating characteristic curve (AUC-ROC) scores across all instances are presented in Table 1.

TABLE 1

| Average accuracy (AUC-ROC) across all instances for single vs. many attack models | | | | | | |
|---|---|---|---|---|---|---|
| Model | S-CL01 | M-CL01 | S-CL0 | M-CL0 | S-CL1 | M-CL1 |
| RB CoLA | 0.58 | 0.65 | 0.66 | 0.69 | 0.56 | 0.63 |
| | (0.59) | (0.66) | (0.67) | (0.71) | (0.57) | (0.64) |
| BB SST2 | 0.56 | 0.64 | 0.59 | 0.64 | 0.55 | 0.62 |
| | (0.57) | (0.65) | (0.6) | (0.66) | (0.56) | (0.64) |
| F-UL2 | 0.57 | 0.66 | 0.61 | 0.67 | 0.56 | 0.65 |
| CoLA | (0.58) | (0.67) | (0.65) | (0.68) | (0.57) | (0.66) |
| F-UL2 | 0.61 | 0.66 | 0.61 | 0.65 | 0.63 | 0.67 |
| SST2 | (0.63) | (0.68) | (0.62) | (0.67) | (0.67) | (0.7) |
| RB RT | 0.64 | 0.68 | 0.64 | 0.68 | 0.66 | 0.7 |
| | (0.66) | (0.71) | (0.66) | (0.71) | (0.68) | (0.73) |
| RB-DP | 0.52 | 0.64 | 0.54 | 0.63 | 0.54 | 0.63 |
| RT | (0.53) | (0.65) | (0.54) | (0.64) | (0.55) | (0.64) |

The experiments show that the present technique leads to improvements of between 3%-12% in accuracy and AUC-ROC for all models, datasets, and attacks tested, even when compared with class-based methods. Surprisingly, for the defended model (RB-DP RT), even though previous attacks seem mostly mitigated with scores ranging from 0.52 to 0.55 (which is very close to random guessing), the present technique was still able to achieve a significant advantage of up to 0.65.

It is also worth noting that the present technique outperforms class-based attacks (S-CL0, S-CL1) by 3-10% even when applied to the whole dataset, regardless of class (CL01). In some cases, the combination of many attacks with the class-based approach provides an additional 1% gain.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range-10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:

receiving a training dataset and a testing dataset each comprising samples that were used to train and to test, respectively, a certain machine learning model;

dividing the training dataset into non-overlapping training subsets, and the testing dataset into non-overlapping testing subsets;

assigning the training subsets and the testing subsets into pairs, such that each of the pairs is a distinct combination of one of the training subsets with one of the testing subsets;

training different membership inference attack (MIA) models on the pairs; and evaluating sensitive information leakage from the certain machine learning model based on aggregated inferences by the trained MIA models.

2. The computer-implemented method of claim 1, further comprising, prior to the training of the different MIA models:

repeatedly dividing each of the pairs into a fitting set and an inference set, thereby producing multiple fitting and inference sets for each of the pairs, such that:

each of the multiple fitting and inference sets comprises samples from both the respective training subset and the respective testing subset, and in each repetition, the samples are distributed differently among the multiple fitting and inference sets.

3. The computer-implemented method of claim 2, wherein the training of the different MIA models comprises:

training the different MIA models on each of the multiple fitting sets, wherein each the MIA models differs in at least one of the following parameters: classifier type, feature, or feature scaling method;

for each of the pairs, applying the selected trained MIA models to the respective inference set, to infer whether each of the samples in the respective inference set is a member of the training dataset; and for each of the pairs, selecting one of the trained MIA models that has a highest inference performance.

4. The computer-implemented method of claim 3, wherein the aggregated inferences are obtained by aggregating the inferences of all the selected trained MIA models.

5. The computer-implemented method of claim 3, wherein:

the classifier type is selected from the group consisting of: a random forest classifier, a k-nearest neighbors classifier, a decision tree classifier, and a neural network classifier;

the feature is selected from the group consisting of: entropy, loss, label, logit, and class probability; and the feature scaling is selected from the group consisting of: standard scaling, minmax scaling, robust scaling, mean normalization, max absolute scaling, unit vector scaling, logarithmic scaling, and quantile transforms.

6. The computer-implemented method of claim 1, further comprising preventing sensitive information leakage from the certain machine learning model by:

receiving an output of the certain machine learning model;

generating adversarial perturbations based on the trained different MIA models, respective of the received output;

aggregating the generated adversarial perturbations into a single adversarial perturbation; and applying the single adversarial perturbation to the received output, to generate a revised output that does not convey information on whether a certain sample was used to train the certain machine learning model.

7. The computer-implemented method of claim 1, wherein:

the certain machine learning model is a shadow model of a target machine learning model;

the received training and testing datasets have contents that resemble estimated characteristics of an unknown training dataset and an unknown testing dataset, respectively, of the target machine learning model; and the method further comprises evaluating sensitive information leakage from the target machine learning model based on the evaluation of sensitive information leakage from the certain machine learning model.

8. A system comprising:

(a) at least one hardware processor; and (b) a non-transitory computer-readable storage medium having program code embodied therewith, the program code executable by said at least one hardware processor to:

receive a training dataset and a testing dataset each comprising samples that were used to train and to test, respectively, a certain machine learning model, divide the training dataset into non-overlapping training subsets, and the testing dataset into non-overlapping testing subsets, assign the training subsets and the testing subsets into pairs, such that each of the pairs is a distinct combination of one of the training subsets with one of the testing subsets, train different membership inference attack (MIA) models on the pairs, and evaluate sensitive information leakage from the certain machine learning model based on aggregated inferences by the trained MIA models.

9. The system of claim 8, wherein the program code is further executable, prior to the training of the different MIA models, to:

repeatedly divide each of the pairs into a fitting set and an inference set, thereby producing multiple fitting and inference sets for each of the pairs, such that:

each of the multiple fitting and inference sets comprises samples from both the respective training subset and the respective testing subset, and in each repetition, the samples are distributed differently among the multiple fitting and inference sets.

10. The system of claim 9, wherein the training of the different MIA models comprises:

training the different MIA models on each of the multiple fitting sets, wherein each the MIA models differs in at least one of the following parameters: classifier type, feature, or feature scaling method;

for each of the pairs, applying the selected trained MIA models to the respective inference set, to infer whether each of the samples in the respective inference set is a member of the training dataset; and for each of the pairs, selecting one of the trained MIA models that has a highest inference performance.

11. The system of claim 10, wherein the aggregated inferences are obtained by aggregating the inferences of all the selected trained MIA models.

12. The system of claim 10, wherein:

the classifier type is selected from the group consisting of: a random forest classifier, a k-nearest neighbors classifier, a decision tree classifier, and a neural network classifier;

the feature is selected from the group consisting of: entropy, loss, label, logit, and class probability; and the feature scaling is selected from the group consisting of: standard scaling, minmax scaling, robust scaling, mean normalization, max absolute scaling, unit vector scaling, logarithmic scaling, and quantile transforms.

13. The system of claim 8, wherein the program code is further executable to prevent sensitive information leakage from the certain machine learning model by:

receiving an output of the certain machine learning model;

generating adversarial perturbations based on the trained different MIA models, respective of the received output;

aggregating the generated adversarial perturbations into a single adversarial perturbation; and applying the single adversarial perturbation to the received output, to generate a revised output that does not convey information on whether a certain sample was used to train the certain machine learning model.

14. The system of claim 8, wherein:

the certain machine learning model is a shadow model of a target machine learning model;

the received training and testing datasets have contents that resemble estimated characteristics of an unknown training dataset and an unknown testing dataset, respectively, of the target machine learning model; and the method further comprises evaluating sensitive information leakage from the target machine learning model based on the evaluation of sensitive information leakage from the certain machine learning model.

15. A computer program product comprising a non-transitory computer-readable storage medium having program code embodied therewith, the program code executable by at least one hardware processor to:

receive a training dataset and a testing dataset each comprising samples that were used to train and to test, respectively, a certain machine learning model, divide the training dataset into non-overlapping training subsets, and the testing dataset into non-overlapping testing subsets, assign the training subsets and the testing subsets into pairs, such that each of the pairs is a distinct combination of one of the training subsets with one of the testing subsets, train different membership inference attack (MIA) models on the pairs, and evaluate sensitive information leakage from the certain machine learning model based on aggregated inferences by the trained MIA models.

16. The computer program product of claim 15, wherein the program code is further executable, prior to the training of the different MIA models, to:

repeatedly divide each of the pairs into a fitting set and an inference set, thereby producing multiple fitting and inference sets for each of the pairs, such that:

each of the multiple fitting and inference sets comprises samples from both the respective training subset and the respective testing subset, and in each repetition, the samples are distributed differently among the multiple fitting and inference sets.

17. The computer program product of claim 16, wherein the training of the different MIA models comprises:

training the different MIA models on each of the multiple fitting sets, wherein each the MIA models differs in at least one of the following parameters: classifier type, feature, or feature scaling method;

for each of the pairs, applying the selected trained MIA models to the respective inference set, to infer whether each of the samples in the respective inference set is a member of the training dataset; and for each of the pairs, selecting one of the trained MIA models that has a highest inference performance.

18. The computer program product of claim 17, wherein the aggregated inferences are obtained by aggregating the inferences of all the selected trained MIA models.

19. The computer program product of claim 17, wherein:

the classifier type is selected from the group consisting of: a random forest classifier, a k-nearest neighbors classifier, a decision tree classifier, and a neural network classifier;

the feature is selected from the group consisting of: entropy, loss, label, logit, and class probability; and the feature scaling is selected from the group consisting of: standard scaling, minmax scaling, robust scaling, mean normalization, max absolute scaling, unit vector scaling, logarithmic scaling, and quantile transforms.

20. The computer program product of claim 15, wherein the program code is further executable to prevent sensitive information leakage from the certain machine learning model by:

receiving an output of the certain machine learning model;

generating adversarial perturbations based on the trained different MIA models, respective of the received output;

aggregating the generated adversarial perturbations into a single adversarial perturbation; and applying the single adversarial perturbation to the received output, to generate a revised output that does not convey information on whether a certain sample was used to train the certain machine learning model.

*    *    *    *    *